June 9, 1925.
J. A. MURPHEY
VEHICLE HEADLIGHT
Filed Feb. 9, 1924
1,541,586
FIG. I.
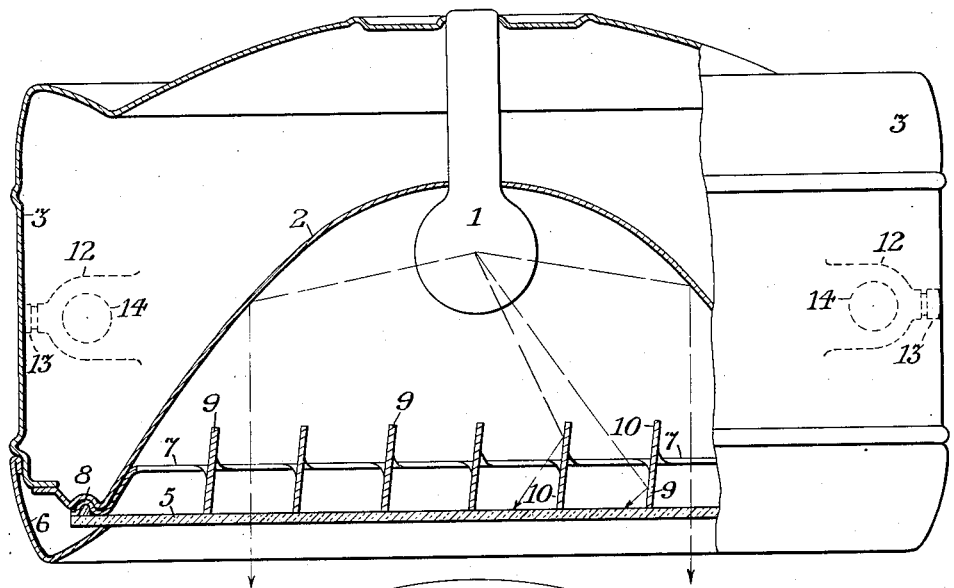
FIG. II.
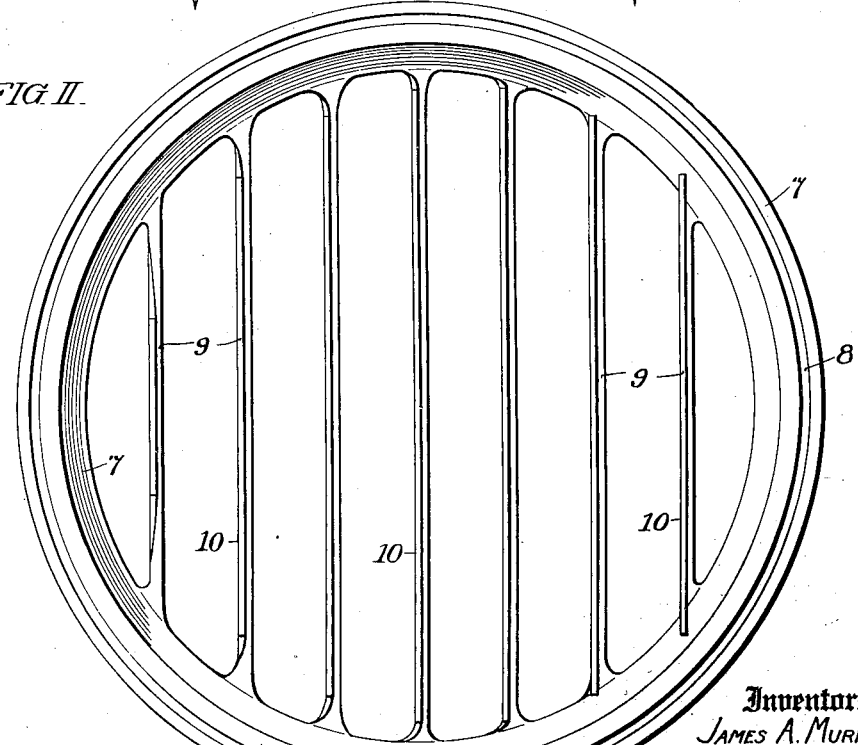
Inventor:
James A. Murphey, Patented June 9, 1925.

1,541,586

UNITED STATES PATENT OFFICE.

JAMES A. MURPHEY, OF GERMANTOWN, PENNSYLVANIA.

VEHICLE HEADLIGHT.

Application filed February 9, 1924. Serial No. 691,547.

*To all whom it may concern:*

Be it known that I, JAMES A. MURPHEY, a citizen of the United States, residing at Germantown, in the county of Philadelphia and State of Pennsylvania, have invented a certain new and useful Improvement in Vehicle Headlights, whereof the following is a specification, reference being had to the accompanying drawings.

Laws in force throughout the United States so regulate the location and the operation of head lights upon motor vehicles that it is difficult, and sometimes impossible, to provide adequate illumination of the path to be traversed by such a vehicle. For instance, such laws require, first, that the head light casings shall be held stationary on the vehicle and, second, shall be so controlled as not to project light in front of the vehicle in such direction or to such a degree as to afford a glare to the vision of persons approaching from the opposite direction. Compliance with the first requirement aforesaid leaves the operators of such vehicles without illumination of the right hand side of the road when turning to the right, for such lights are projected in alinement with the length of the vehicle and, when the latter is turning to the right, illuminate only the left hand side of the road. Moreover, in order to comply with the second requirement, it is usual to provide such head lights with some "dimming" means to minimize the light projected therefrom upon the approach of another vehicle; with the result that the least light is afforded to the operator upon the occasions when most is needed.

Such dimming means are of two classes, first, comprising electrical resistance which is interposed in the circuit connecting the lights with the generator by which they are energized and, second, mechanical shutters for confining the lights to their casings or to the road below and directly in front thereof. Of course, devices of both said classes waste the electrical energy otherwise available for illumination.

Therefore, it is the object and effect of my invention to provide head lights which are operable in compliance with all of the laws aforesaid and yet afford illumination of the right hand side of the road when such vehicles are turning to the right, as well as when they are turning to the left, and adequate illumination directly in front of the vehicle and to a sufficient distance, without affording the objectionable glare aforesaid. As hereinafter described, my invention provides means permitting maximum illumination of the road in front of such a vehicle to an adequate distance, associated with means for diverting a portion of the light normally projected directly in front of the vehicle and in alinement with its length, so that such portion is directed by reflection sidewise, to continually illuminate the side of the road without waste of electrical energy characteristic of said devices of the prior art; all of the electrical energy in the lighting circuit being continuously utilized, by my invention, instead of being wasted in resistance coils or by suppression of the light produced.

As hereinafter described, my invention includes a head light casing inclosing an electric incandescent lamp or other source of light and having a reflector or reflectors consisting of a vertical bar or series of parallel bars fixed in such angular relation as to continuously deflect the light sidewise. As hereinafter set forth, such a reflecting element or elements may be located either at the front or at the rear of the source of light, and may be associated with light projecting means of ordinary types including parabolic reflectors; the purpose and effect of my special reflecting means being merely to divert to the side of the road, in front of the vehicle, a portion of the light which would otherwise be projected forwardly parallel to or in symmetrical relation with the axis of the light casing.

My invention includes the various novel features of construction and arrangement hereinafter more definitely specified.

In said drawings; Fig. I is a fragmentary plan sectional view of a head light casing embodying my invention and comprising a plurality of reflecting elements forming a vertically barred grille in front of the source of light and in fixed relation with the light casing.

Fig. II is an outside elevation of the unitary vertically barred reflecting grille shown in Fig. I.

In said figures; the casing for the source of light 1, which is illustrated as an incandescent electric bulb, conveniently includes the pressed sheet metal parabolic reflector 2 mounted in the substantially cylindrical body 3 having, at the front thereof, the translucent panel 5 which may be plane glass or a lens, held in position by a removable ring 6. Said casing is provided with light diverting means in accordance with my invention comprising the sheet of metal 7 forming a dished plate which is circular in its perimeter, which is parabolically inclined in correspondence with said casing; is conveniently provided with an annular rib 8 arranged to be wedged in a corresponding annular recess in said casing, as shown in cross section in Fig. I, to centralize it in said casing and is slit vertically to form a series of vertically extending strips of metal 9 each having a reflecting surface 10 presented toward said source of light 1 and is held, by the wedging action upon said rib 8, as above contemplated, in such angular relation to the axis of the casing as to reflect the light from said source 1 laterally at the desired angle as, for instance, illustrated by the dash lines in Fig. I. It is to be noted that one of said light deflecting strips or bars 9 crosses the axis of said casing and obstructs and deflects the axial light rays from said source 1 laterally.

It is to be understood that said rib 8 on the metal disk 7, the annular groove in the casing in which it fits, and the ring 6 which holds the parts in the assembled position shown in Fig. I, constitute means for preventing any movement of the deflecting element 7 which would tend to displace said strips 9 from the predetermined vertical position in which they are set, as shown. Moreover, in the dished form of my invention shown in Fig. I, wherein a converging portion of said disk 7 is fitted in close contact with the parabolic surface of the reflector 2, as shown in section in Fig. I, additional frictional engagement is afforded to secure and maintain said bars 9 in their vertical position. It is to be understood that, in the appended claims, the expression "wedging means extending obliquely to the axis of the light casing" is exemplified by either or both said rib 8 and the conical surface of the plate 7 which is in frictional engagement with the reflector 2 as aforesaid.

As above noted, the laws require that such light casings be provided with means to hold them stationary upon the vehicle, and I have indicated such means as comprising a pair of sockets 12 which are rigidly connected with said casing 3 and provided with set screws 13 to engage projections on the vehicle which are fitted into seats 14 in said sockets. However, any other suitable means may be employed to hold my improved headlight casings stationary with respect to vehicles in such manner as to continuously project a portion of the light forwardly from the casings, between said reflecting bars 9, to manifest the required warning signal at a distance from the vehicle, contemporaneously with the illumination of the side of the road, which is effected by the means above described.

Although I have indicated an electric source of light; it is, of course, to be understood that any suitable source of light may be employed.

I have found it convenient to form said light diverting elements 9 in unitary relation with each other and of ductile metal such as aluminum having the reflecting surfaces 10 thereof produced by wire brushing such metal. Such operation forms a silvery "frosted" surface. Such construction is economical as the sheet metal may be brushed or planished in plane form and subsequently shaped by a single die stamping operation. However, suitable deflecting elements may be formed of other material and be otherwise retained in the fixed relation desired. It is to be understood that such panel 5 has arcually extending means at the perimeter thereof, as indicated in Fig. I, whereby it may be held in said fixed position, to maintain the deflector 16 in predetermined vertical position.

Moreover, although I have shown and described reflecting means for diverting the light laterally to the right hand side of the road; it is obvious that if the reflecting elements were turned up side down with reference to their position shown, they would divert the light laterally to the left hand side of the road, and it is to be understood that my invention includes such lateral diversion of the light and, in fact, with the reflecting elements in the position shown, there is a minor reflection of light toward the left hand side of the road, from the elements 9 at the right hand side of the casing.

Therefore, I do not desire to limit myself to the precise details of construction and arrangement herein set forth, as it is obvious that various modifications may be made therein without departing from the essential features of my invention, as defined in the appended claims.

I claim:

1. In a vehicle headlight, the combination with a light casing having means to hold it stationary upon the vehicle; of a source of light in said casing; a parabolic reflector fixed in said casing, in concentric relation with said source of light, arranged to normally project a portion of the light forwardly from said casing, parallel with the axis of said casing; means arranged to contemporaneously divert a portion of the light from said source laterally with respect to said casing and to the right hand side of the road traversed by the vehicle, and considerably in advance of the vehicle, including a dished plate formed of a single piece of pressed sheet metal comprising a plane annular portion extending transversely to the axis of said casing; a reflecting bar extending diametrically across the axis of said casing, in a plane at an acute angle to the axis of said casing, and merging at its ends into said plane annular portion; other reflecting bars upon respectively opposite sides of, and parallel with, said diametrical bar and in unitary relation with said dished plate, respectively merging at their ends into said transversely extending plane portion of said plate, and in unitary relation with an annular parabolic zone of said plate; and means arranged to hold said dished plate with said bars in vertical position, including an annular recess at the mouth of said parabolic reflector and an annular rib on said dished plate fitted to said annular recess; and means arranged to hold said dished plate in wedging engagement with said parabolic reflector, including a ring engaging said casing, exterior to said plate, and arranged to press the latter rearwardly.

2. In a vehicle headlight, the combination with a light casing having means to hold it stationary upon the vehicle; of a source of light in said casing; a reflector fixed in said casing, in concentric relation with said source of light, arranged to normally project a portion of the light forwardly from said casing; means arranged to contemporaneously divert a portion of the light from said source laterally with respect to said casing and to the right hand side of the road traversed by the vehicle, and considerably in advance of the vehicle, including a dished plate formed of a single piece of pressed sheet metal comprising an annular plane portion extending transversely to the axis of said casing; a reflecting bar extending diametrically across the axis of said casing in a plane at an acute angle to the axis of said casing, and merging at its ends into said plane annular portion; other reflecting bars upon respectively opposite sides of, and parallel with, said diametrical bar and in unitary relation with said dished plate, respectively merging at their ends into said transversely extending plane portion of said plate, and in unitary relation with an annular parabolic zone of said plate; and means arranged to hold said dished plate with said bars in vertical position, including an annular recess at the mouth of said casing reflector and an annular rib on said dished plate fitted to said annular recess; and means arranged to hold said dished plate in engagement with said reflector, including a ring engaging said casing, exterior to said plate, and arranged to press the latter rearwardly.

3. A vehicle headlight accessory, including a circular dished plate formed of a single piece of pressed sheet metal comprising a plane annular portion extending transversely to the axis of said plate; a stationary reflecting bar extending diametrically across the axis of said plate in a plane at an acute angle to said axis, and merging at its ends into said plane annular portion; other stationary reflecting bars upon respectively opposite sides of, and parallel with, said diametrical bar and in unitary relation with said dished plate, respectively merging at their ends into said transversely extending plane portion of said plate, and in unitary relation with an annular parabolic zone of said plate; and means arranged to hold said dished plate with said bars in vertical position, including an annular rib on said dished plate projecting rearwardly from the outer side of said parabolic zone.

4. A vehicle headlight accessory, including a circular plate formed of a single piece of pressed sheet metal comprising a plane annular portion extending at right angles to the axis of said plate; a stationary reflecting bar extending diametrically across the axis of said plate in a plane at an acute angle to said axis, and merging at its ends into said plane annular portion; other stationary reflecting bars upon respectively opposite sides of, and parallel with, said diametrical bar and in unitary relation with said dished plate, respectively merging at their ends into said transversely extending plane portion of said plate, and in unitary relation with an annular zone of said plate, inwardly converged toward said axis; and means arranged to hold said dished plate with said bars in vertical position, including an annular member at the outer end of said plate.

5. A vehicle headlight accessory, including a circular dished plate formed of a single piece of pressed sheet metal comprising a plane portion extending transversely to the axis of said plate and carrying an element constructed and arranged to divert light laterally with respect to said axis; said plate comprising an annular zone diverging outwardly from said axis at the perimeter of said plane annular portion of said plate and having, at the outer edge thereof, an annular member arranged to hold said dished plate in such headlight.

6. A vehicle headlight accessory, including a light diverting member comprising a single bar having opposite plane surfaces extending transversely to the axis of the headlight, and means arranged to hold said bar extending diametrically across the axis of said headlight, including a circular dished plate formed of a single piece of pressed sheet metal comprising a plane annular portion extending transversely to the axis of said plate and having an annular member at the outer end of said plate, arranged to engage said headlight.

In testimony whereof, I have hereunto signed my name at Philadelphia, Pennsylvania, this fourth day of February, 1924.

JAMES A. MURPHEY.

Witnesses:
 CAROLINE E. REUTER,
 HARRY A. MOSER.